Aug. 18, 1931. H. PIEPER 1,819,971
SERVO BRAKE
Filed Dec. 23, 1924    3 Sheets-Sheet 1
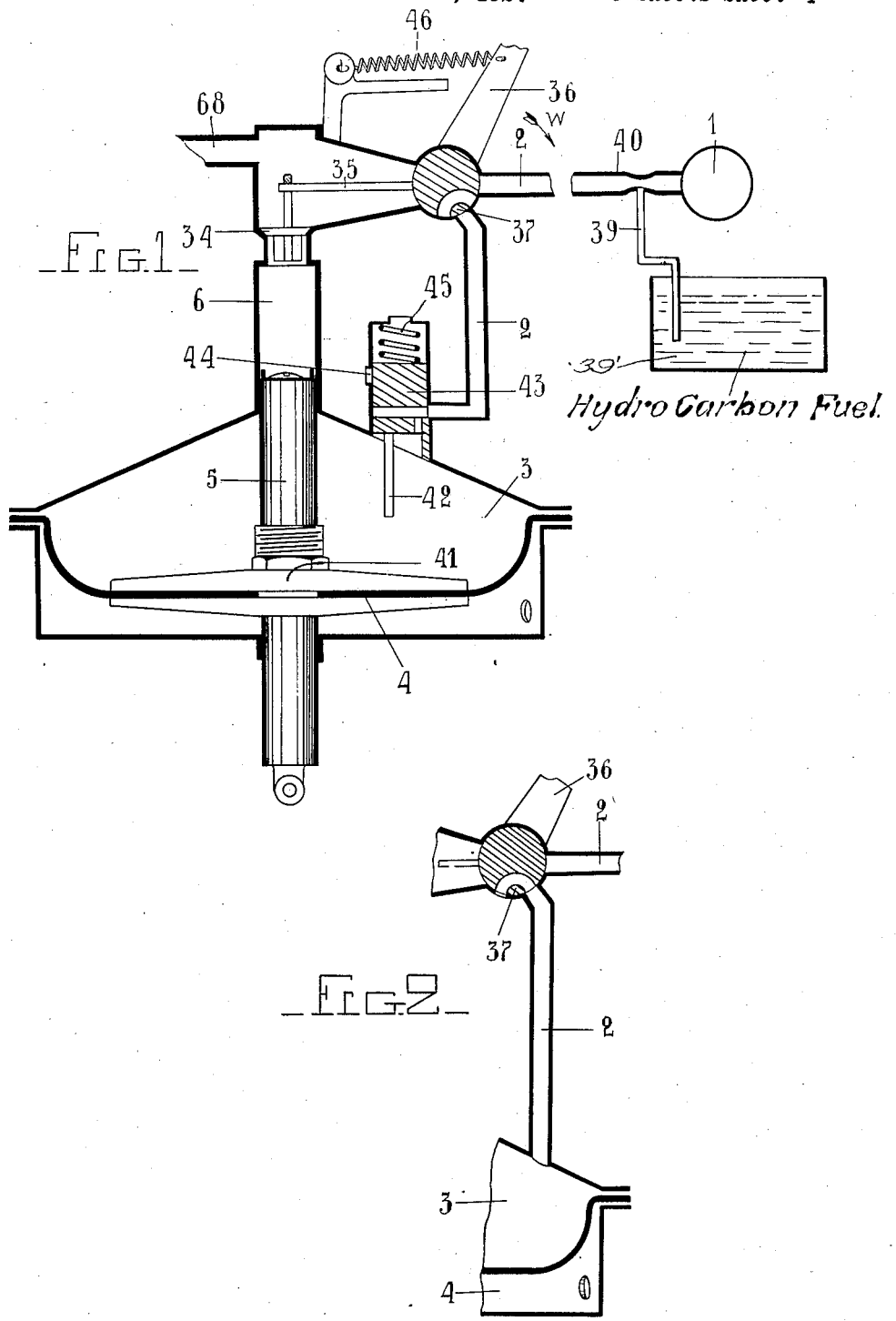
Inventor
H. Pieper
by Langner, Parry, Card + Langner
Attys.

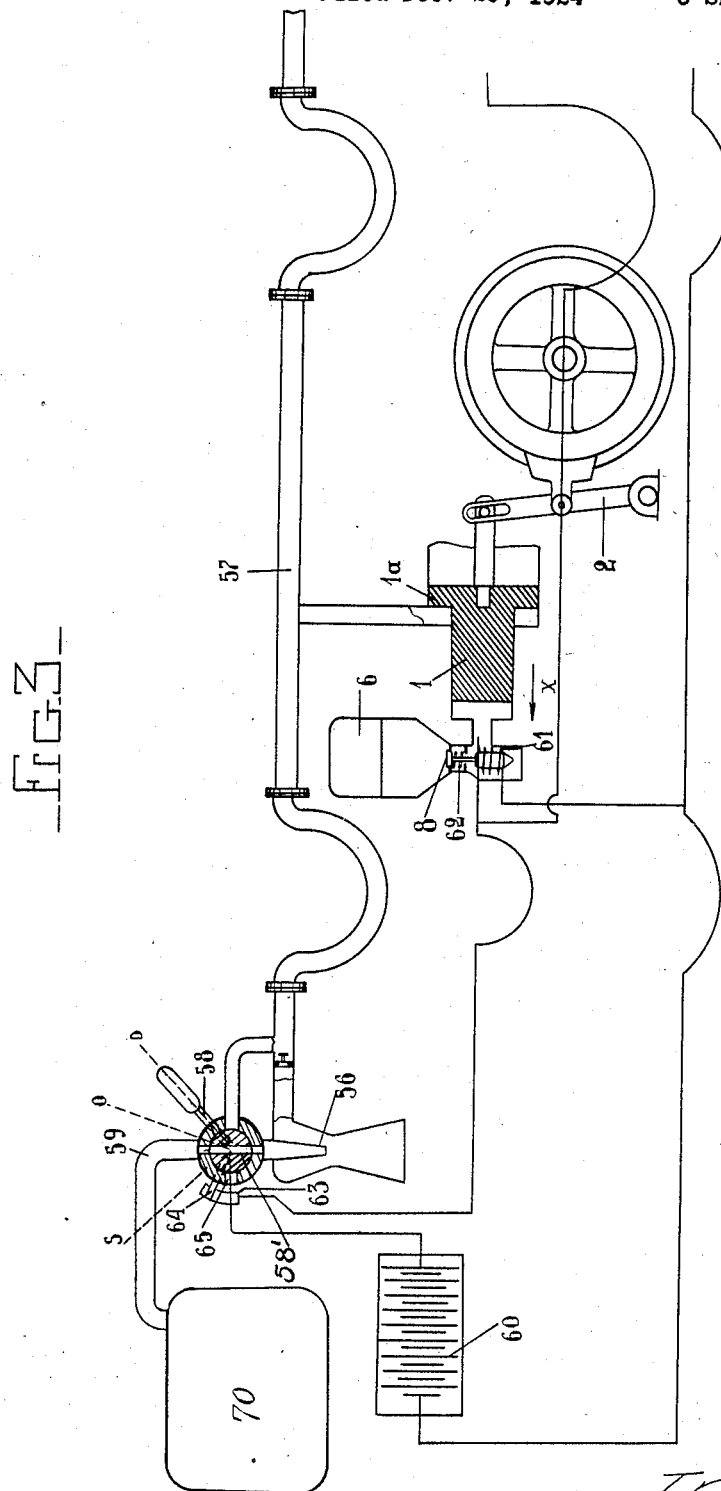

Aug. 18, 1931.  H. PIEPER  1,819,971
SERVO BRAKE
Filed Dec. 23, 1924  3 Sheets-Sheet 3
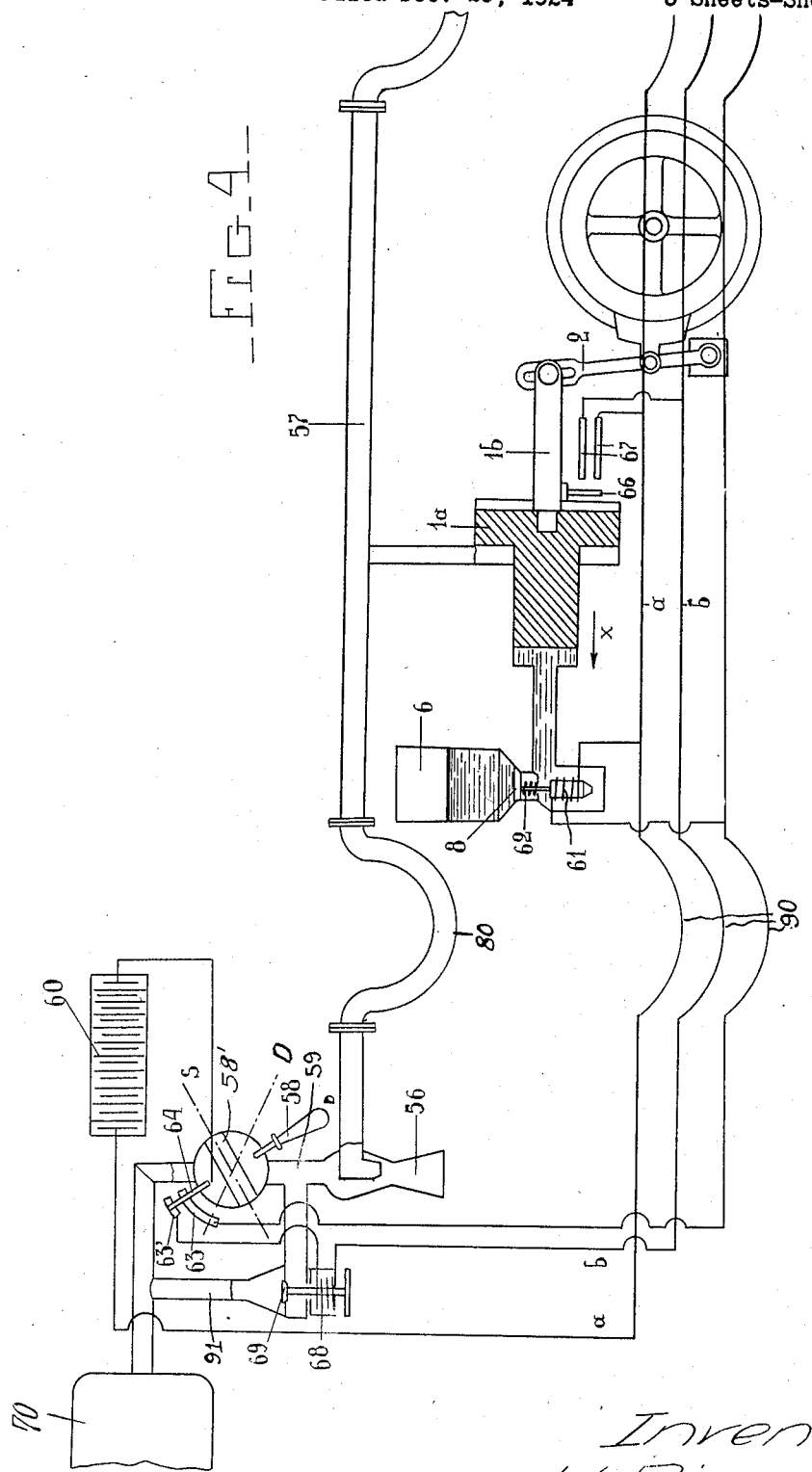
Inventor
H. Pieper
by Langner, Parry, Card & Langner
Att'ys Patented Aug. 18, 1931

1,819,971

UNITED STATES PATENT OFFICE

HENRI PIEPER, OF LIEGE, BELGIUM, ASSIGNOR TO COMPAGNIE INTERNATIONAL DES FREINS AUTOMATIQUES, SOCIETE ANONYME, OF LIEGE, BELGIUM

SERVO BRAKE

Application filed December 23, 1924, Serial No. 757,747, and in Belgium December 29, 1923.

A servo brake is a braking arrangement wherein the operator does not directly exert the braking effort, but only controls the delivery and action of a source of energy which produces the braking force. The latter comprises mechanical, hydraulic or pneumatic means.

This invention consists essentially in the feature that, for applying the brake, use is made of a gas under pressure acting on a liquid which displaces a piston connected to the brake transmission, the brakes being released by means of a partial vacuum produced, for example, by means of the engine actuating a vehicle. The partial vacuum used for releasing purposes acts in a direction opposite to that of the liquid under pressure, and releases the brake, means being provided for admitting atmosphere to the vacuum chamber after brake release, which restores the braking means to their initial state.

The invention further relates to an improvement which may be applied in a general manner to all servo brakes which utilize a partial vacuum produced by the suction of an internal combustion engine.

According to the invention the intake manifold is utilized for drawing the air from the space in which the partial vacuum is produced, during the functioning of the manifold as a conduit for the supply of combustible mixture to the engine. Thus an excess proportion of air is admitted to the mixture, which ordinarily would interrupt the continuous smooth running of the engine, but by the present invention, a commensurate additional quantity of hydrocarbon is drawn into the intake manifold simultaneously with the evacuation of the brake chamber, so that the proportions of the mixture supplied to the engine will remain unaltered.

The means for producing the releasing partial vacuum may be automatically withdrawn from operation as soon as the brakes are released. For this purpose use could be made, for example, of devices controlled electrically. Three forms of construction of the invention are illustrated by way of example in the accompanying drawings, in which:

Figure 1 illustrates diagrammatically a servo brake for a vehicle shown in the braking position and in which the release of the brake is effected by a partial vacuum produced by the suction of an internal combustion engine, Figure 2 shows in section a modified form of the valve shown in Figure 1 for controlling the establishment of the partial vacuum in the servo brake, Figure 3 illustrates diagrammatically with parts in section a brake installation for a train of vehicles, the control apparatus being shown in the released position and in which the release of the brake is effected by a partial vacuum produced by a steam-ejector.

Figure 4 illustrates diagrammatically with parts in section the arrangement of the braking system for a train of vehicles wherein the partial vacuum which effects the release, ceases automatically as soon as all the brakes are released the control apparatus being shown in neutral position.

In the case shown in Figure 1, the mechanism of the brake, not shown, is connected to a rod 5 attached to a diaphragm 4 which moves in a space 3, the said rod forming a piston sliding in the cylinder 6.

The fluid under pressure which causes the brakes to be applied acts in the cylinder.

For applying the brakes, a valve 34 controlling the passage of the fluid under pressure from fluid supply passage 68, is opened by means of a control lever 36 actuating an arm 35 which may move the said valve 34 away from its seat. For this operation the control lever 36 is displaced in the direction of the arrow W and against the action of the return spring 46.

In order to release the brakes, a partial vacuum is created in the space 3, for example, by drawing out air through the pipe 2.

The invention consists in the provision of means for producing the movement due to the combination of these two opposing forces which permits graduating the braking intensity.

The above mentioned suction of the air is effected by connecting the pipe 2 to the intake manifold 1 of an internal combustion engine.

The brake is controlled as above said by means of a lever 36 provided with a return spring 46 controlling the communication of said pipe with said manifold and actuating on the one hand a valve 37 placed in the pipe 2, and on the other hand, a valve 34 placed between the cylinder 6 and the pipe 68 which delivers a brake actuating fluid under pressure.

When the air is drawn out of the space 3, it passes through the conduit 2 through suction of the intake manifold of the explosion engine, and passes through a diffuser 40 into which opens an auxiliary nozzle 39 which communicates with a reservoir 39' of hydrocarbon fuel, in such a manner that the air current in the diffuser produces a reduction of pressure in the diffuser which in turn draws out combustible fluid from the auxiliary nozzle 39, into the intake manifold in such a way that the explosive mixture provided in the intake manifold by the main carburetting nozzle, not shown, is not modified by the current of air from the brake space but remains constant in proportions.

The valve 34 which rests freely on its seat when the brakes are released, prevents the fluid under pressure from entering into cylinder 6 from passage 68 as long as the valve is not raised by a displacement of the lever 36 in the direction of the arrow W. It forms a hydraulic catch device.

For releasing the brake, the lever 36 is actuated in the reverse direction of the arrow so that the air is drawn out of the space 3 through the conduit 2 and the valve 37. By the action of the partial vacuum produced in the space 3, the piston 5 moves in the cylinder 6 against the pressure of the liquid which is returned through the valve 34 and the duct 68. The partial vacuum exerts a greater pressure than that exerted by the liquid.

When the brakes are completely released, the disc 41, which serves for the attachment of the flexible diaphragm 4, moves into contact with a pin 42 of a slide valve 43 which is thus displaced so that it breaks the communication between the space 3 and the pipe 2 and establishes a communication between this space and an orifice 44 open to the atmosphere.

The air thus entering the space 3 enables the brakes to be applied later on.

If for any reason leakage occurs past the valve 34 the rod 5 will drop a little and the slide valve 43 will follow it immediately in this movement under the influence of the spring 45, so that all the members will be brought back into the desired position due to the pull produced by the partial vacuum existing in the pipe 2.

By way of modification the cock which is operated by the lever 36 may be constructed as shown in Figure 2. With this arrangement, the valve 37 can put the space 3 in communication either with the partial vacuum existing in the intake manifold 1, or with the atmosphere.

In the case shown in Figures 3 and 4 the brakes are applied by means of a fluid under pressure stored in a container 6 provided upon each vehicle and which may act upon a piston 1 connected to the brake mechanism. This operation is controlled by a valve 8 which is held on its seat by the electromagnetic action of the solenoid 61 supplied with current by a battery 60, the valve being raised from its seat, either when the brakes are released in order to open the passage to the liquid forced out, or when the current is broken the effect of which is to leave the valve acted upon by its spring alone.

In order to apply the brake it is sufficient to cut off the current in the solenoid 61. To effect this, the circuit from the battery 60 may be opened by separating the arm 64 from the contact stud 63, as hereinafter explained.

In order to release the brake use is made of a steam ejector supplied by steam generated in a boiler 70 and which traverses the conduit 59, the said ejector producing a partial vacuum in a conduit 57 and acting on an annular face of the piston 1a rigidly connected to the piston 1. The action exercised by said partial vacuum causes the piston 1 to be moved in the direction of the arrow X; the valve 8 is lifted from its seat by the pressure of the liquid returned by the piston 1 and against the force of the solenoid 61, the electric circuit of which being closed.

The control cock 58 regulates both the partial vacuum and the above electric circuit.

In the case shown in Figure 3, when the lever is in the position D corresponding to the release of the brakes, the injector operates and the electric circuit of the solenoid 61 is closed. When the lever is in the position S, corresponding to the application of the brakes, the pipe 59 of the injector 56 is closed, the pipe 57 is in communication with the atmosphere through the orifice 65 and the electric circuit is open on account of the fact that the arm 64 has moved off the contact stud 63.

When the lever is in the position O, which is the neutral position, the pipe 59 is closed and the electric circuit is also closed. The pipe 57 is not in communication with the atmosphere.

The diameter of the piston as well as the degree of vacuum produced by the injector 56 is such that the force to which the piston 1 is subjected in its period of release, can attain a value greater than the force causing the tightening of the brakes.

In the case shown in Figure 4 as well as in Figure 3, the drawings represent diagrammatically, part of a train of cars, the boiler 70, battery 60, ejector 56, cock 8, and the valve 69 being carried by the locomotive while the brake-piston, 1—1a, valve 8, and cylinder 6 of compressed fluid, constitute a unit repeated for each car of the train. The curved dips 80 in the train pipe 57 represent the couplings between cars and the similar dips 90 in the circuit wires representing the portions which extend from one car to another. The steam pipe 59 has a branch conduit 91 which by-passes the cock 58 and communicates direct with the ejector 56. The said by-pass is controlled by a check valve 69 operated electrically by a solenoid 68. The solenoid is in an electrical circuit comprising the two wires $a$ and $b$, across which are connected in parallel, switches, one for each unit of brake mechanism, each switch comprising the terminals 67 and a contact 66, carried by the piston and bridging the terminals 67 whenever the piston is in brake setting position. It will thus appear that the circuit $a$, $b$ is open whilesoever all of the brakes are in released position but if one or more of the brakes are not fully released, the contact 66 associated with that brake operating mechanism will close the circuit through the terminal 67, energizing the solenoid 68 and opening the valve 69. The purpose of the valve 69, by-pass 97, and the controlling circuit for said valve is as follows. The release of the brake is effected by placing the cock 58 in the position D so as to place the boiler 70 into communication with the ejector 56 by way of the valve passage 58′, thus activating the ejector and producing vacuum in the train pipe which affects all of the braking units for the purpose of releasing the brakes. Under the supposition that all the brakes have been released the engineer may then move the cock to neutral position. However, it may happen that one or more of the brakes may move more sluggish than the others so as not to be fully released when the cock 58 is moved to neutral position O. Under this circumstance, the brake will drag not only wearing the brake and wheel, but exercising a retardative effect upon the train. To prevent such dragging of brakes irrespective of the fact that the cock 58 may be in neutral position, the circuit $a$, $b$ will be closed through the switch associated with the brake that still drags, that is, the brake that is not fully released, so that the valve 69 will continue to remain open under the effect of the energized solenoid 68, thereby permitting a continuation of the operation of the ejector until the sluggish brakes have all been released.

When the lever of the cock 58 is at D, which position corresponds to release, the arm 64 has left the contact stud 63′ but not the stud 63, and the cock 58 is closed. The port 58′ in the valve 58 will connect boiler 70 with the nozzle 56, and the injector of which the nozzle is a part will operate. For the application of the brake, the cock 58 is moved from the releasing position D towards the braking position S. When beginning this movement, the solenoids 61 are placed out of circuit. The valve 8 opens under the action of spring 62, but since a vacuum exists in the pipe 57, the brakes cannot be applied. By continuing to move the cock 58 forward the amount of steam which passes through the injector is decreased by partial closure of the valve 58 and consequently the effort of the fluid under pressure contained in the reservoirs 6 exceeds the opposing effort of the partial vacuum which exists in the pipe 57. At this moment the brakes are applied with a force which is equal to the difference between these two efforts.

By continuing to move the cock 58 forward towards S the supply of steam to the injector is throttled more and more. In the position S, the delivery is completely cut and atmospheric pressure exists in the pipe 57 and the brakes are applied with the maximum pressure.

In order to release the brakes the cock 58 of the valve is moved in the opposite direction towards the releasing position D.

The vacuum is progressively re-established in the pipe 57 and the brakes are released.

It will be understood that this device will enable a perfect variation of both application and release pressures of the brakes to be obtained.

What I claim is:

1. In a servo brake, a brake piston, braking means comprising a gas under pressure acting on a liquid which displaces said piston, vacuum producting means, releasing means which restore said braking means to their initial state by the action of a partial vacuum, and a control apparatus arranged to cause the vacuum producing means to be automatically cut out of action when the brake is completely released.

2. In a servo brake, a brake piston, braking means comprising a gas under pressure acting on a liquid which displaces said piston, vacuum producing means, releasing means which restore said braking means to their initial state by the action of a partial vacuum, a hydraulic catch device arranged to hold the brake in the released position, and a control apparatus for causing the space where the partial vacuum acts to be automatically put into communication with the atmosphere while the said catch device maintains the brakes in released position and when the vacuum producing means is cut out of action.

3. In a servo brake, a brake piston, braking means comprising a gas under pressure acting on a liquid which displaces said piston, releasing means which restore said braking means to their initial state by the action of a partial vacuum, and means arranged to vary the intensity of the partial vacuum whereby to regulate the form of application of the brakes.

4. In a servo brake, a brake piston, braking means comprising a gas under pressure acting on a liquid which displaces said piston, vacuum producing means, releasing means which restore said braking means to their initial state by the action of a partial vacuum, a hydraulic catch device arranged to hold the brake in the released position, a valve controlling cutting into action of the vacuum producing means, and means electrically controlling the catch device through the action of said valve.

5. In a servo brake, a brake piston, braking means comprising a gas under pressure acting on a liquid which displaces said piston, vacuum producing means, releasing means which restore said braking means to their initial state by the action of a partial vacuum, a hydraulic catch device arranged to hold the brake in the released position, a valve controlling cutting into action of the vacuum producing means, means electrically controlling the catch device through the action of said valve, the valve being arranged to put into communication with the atmosphere the space where the partial vacuum acted when it occupies a position corresponding to the releasing of the catch device and and the application of the brakes.

6. In a servo brake system, a brake piston, braking means, and comprising a gas under pressure acting on a liquid which displaces said piston, vacuum producing means, releasing means which restore said braking means to their initial state by the action of a partial vacuum, and a control apparatus including electrical circuits and arranged for causing the vacuum producing means to be automatically cut out of action when all the brakes are completely released.

7. In a system of train brake control, a braking unit for each car comprising a brake, transmission mechanism therefor, and a piston for actuating said brake through said transmission mechanism, actuating means for said piston comprising a gas under pressure acting upon a liquid which displaces said piston, a source of fluid under pressure, vacuum producing means including an ejector operated under fluid under pressure from said source, means for restoring said brake means to initial state of release by the action of partial vacuum obtained from said ejector, hydraulic catch devices one for each unit for holding back the brake operating fluid retaining the brakes in released position, a valve for controlling the commnication of said partial vacuum with said brake releasing means, and electrically operated means auxiliary to said valve for maintaining said ejector operative notwithstanding the position of said valve while any brake in said system remains unreleased, said valve being intercalated in a circuit, and means carried by the brake actuating means of each unit for closing said circuit when said brake is in unreleased position.

In testimony whereof I have affixed my signature.

HENRI PIEPER.